June 14, 1960  R. BIRMANN  2,940,658
TURBO-COMPRESSOR

Filed Feb. 4, 1958  5 Sheets-Sheet 1

FIG. I.

INVENTOR.
RUDOLPH BIRMANN
BY
ATTORNEYS

June 14, 1960  R. BIRMANN  2,940,658
TURBO-COMPRESSOR

Filed Feb. 4, 1958  5 Sheets-Sheet 2

INVENTOR.
RUDOLPH BIRMANN
BY
ATTORNEYS

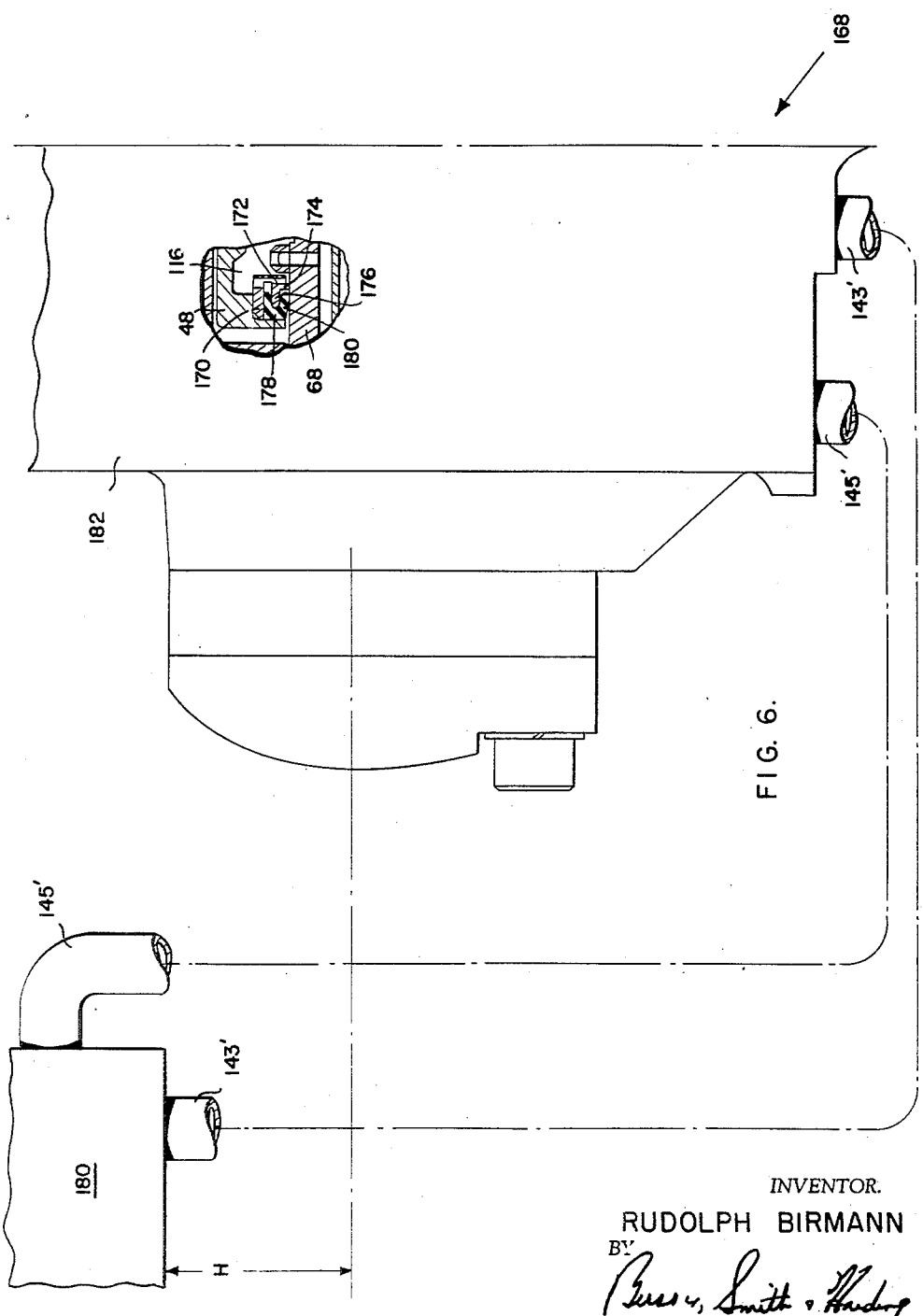

United States Patent Office 2,940,658
Patented June 14, 1960

2,940,658

TURBO-COMPRESSOR

Rudolph Birmann, Newtown, Pa., assignor to De Laval Steam Turbine Company, Trenton, N.J., a corporation of New Jersey Filed Feb. 4, 1958, Ser. No. 713,158

8 Claims. (Cl. 230—116)

This invention relates to turbo-compressors and has particular reference to the mounting of an overhung rotor carrying turbine and compressor blading, and to rotor bearing construction and lubrication therefor.

In particular, in accordance with the invention, there is provided a sleeve bearing mounting for such a rotor having various desirable characteristics as follows:

The rotor is supported practically at its center of gravity, the rotor desirably having located within its body at least a part of a bearing which is mounted externally to a fixed (though slightly displaceable) shaft.

For any shaft proportions (shaft stiffness) required to result in a shaft critical speed of lateral bending which experience has shown must be obtained for satisfactory operation, the circumferential speeds of the sleeve bearing are the minimum and can be held within conventional satisfactory limits in spite of unconventionally high rotational speeds of the rotor. In typical arrangements, for example, the rotor may operate at speeds of the order of 60,000 to 110,000 r.p.m.

The mounting of the rotor is at a point where its temperature is the minimum, approximating ambient atmospheric temperature and the mounting is such that heat flow from the hot portions of the rotor to the bearing by radiation and convection is minimized.

As is well known, operation of very high speed overhung rotors, particularly small ones, presents many difficult problems that arise from the fact that the dynamic behavior of the rotor leads to a series of so-called "critical speeds." These critical speeds fall into a number of different classes and ordinarily manifest themselves in severe vibration associated with an enormous increase in the normally very light loads that the bearings must sustain.

Further in accordance with the invention, there is provided a floating bearing mounting designed to eliminate the deleterious effect of critical speeds, for which purpose it combines, in proper proportions, radial elasticity, angular freedom and damping. Furthermore, it permits full control of the maximum magnitude of radial and angular displacement of the rotor axis. This latter is a particularly important feature which has not previously been accomplished with overhung rotors.

It is well known that any body, rotating freely at high speeds, always tends to rotate around its gravitational axis provided it is not restrained in its orbit-seeking tendency. Conventional shaft mountings of rotors have always been associated with restraining forces, which usually are of an elastic nature (such as result from the shaft itself, mounted in rigid bearings, or the elastic properties of the spring devices used in elastically-mounted bearings). These elastic restraining forces are the source of the previously mentioned critical speeds. The present invention deals with a new rotor mounting which minimizes the presence of elastic restraining forces to such an extent that for all practical purposes the rotor can at all times rotate around its gravitational axis. The causes of critical speeds are eliminated, while at the same time provisions are made to limit the angular and radial freedoms sufficiently to permit operation of the rotor with small clearances. Extensive experimentation has demonstrated that as long as the rotor is really perfectly free—angularly, and with respect to radial displacement—this freedom needs to extend over only very small values of both angles and radial movement to achieve the desired smooth operation. A great deal of difficulty was experienced and a very large number of designs had to be tried to arrive at a rotor mounting characterized by the following:

(1) Complete radial freedom.
(2) Complete angular freedom.
(3) The freedoms under (1) and (2) above limited to a sufficiently small linear and angular distance so as not to interfere with the operation of the rotor under conditions of close blade tip clearances. This involves "stops."
(4) The "stops" under (3) above should provide for a certain amount of elasticity, so that in its centralized position no force acts on the rotor, and the centralizing or restoring forces should increase with the displacement from the centralized position, preventing the occurrence of a sudden, solid stopping of the displacement movement.
(5) In addition to the variable-rate restoring effect described under (4) above, a suitable amount of viscous or friction damping is necessary.
(6) Any friction associated with the freedom of rotor movement for purposes of damping and/or restoring must not change with changing pressure forces—such as axial thrust acting on the rotor.

The use of anti-friction bearings, that is, ball or roller bearings, for mounting very-high-speed rotors, has been found to be undesirable because anti-friction bearings, in order to be operative for this service, must be extremely accurate and are likely to result in failure if minor dust particles or burrs are present, or if the slightest departure from the optimum clearances of all the components of antifriction bearings occurs. For these reasons sleeve bearings generally are more desirable for ultra-high-speed service, since they are not as sensitive to foreign matter and minor dimensional inaccuracies, as are ball bearings.

Involved in the use of sleeve bearings in place of ball bearings are the following considerations:

A suitable sleeve bearing must be provided at reasonable manufacturing cost and having structural simplicity comparable with ball bearing mountings.

The sleeve bearing assembly must operate satisfactorily without oil leakage in either horizontal or vertical installations, and, where vertical, with the rotor either above or beneath the bearing.

Lubrication must be achieved either by the use of engine oil or by means of a self-contained lubricating system without the use of complicated auxiliary apparatus such as an oil supply pump, a scavenging pump and the like. Friction losses must be very small and comparable to those of ball bearings.

The objects of the invention relate to the satisfaction of the foregoing requirements, and these and other objects of the invention relating particularly to details of construction and operation thereof will become apparent from the following description when read in conjunction with the accompanying drawings, in which:

Figure 6 is a fragmentary sectional showing of a modification employed in the turbo-compressor shown in Figure 1 for use with a closed recirculating lubrication system.

The turbo-compressor illustrated and described herein is designed for charging use in association with an internal combustion engine which may be either of diesel or spark ignition type. The turbine of the turbo-compressor is driven by the engine exhaust and the compressor provides air for charging and, in the case of a two-cycle engine, for scavenging. It should be noted, however, that the invention is not limited to turbo-compressors for applications of this type.

Figure 1:
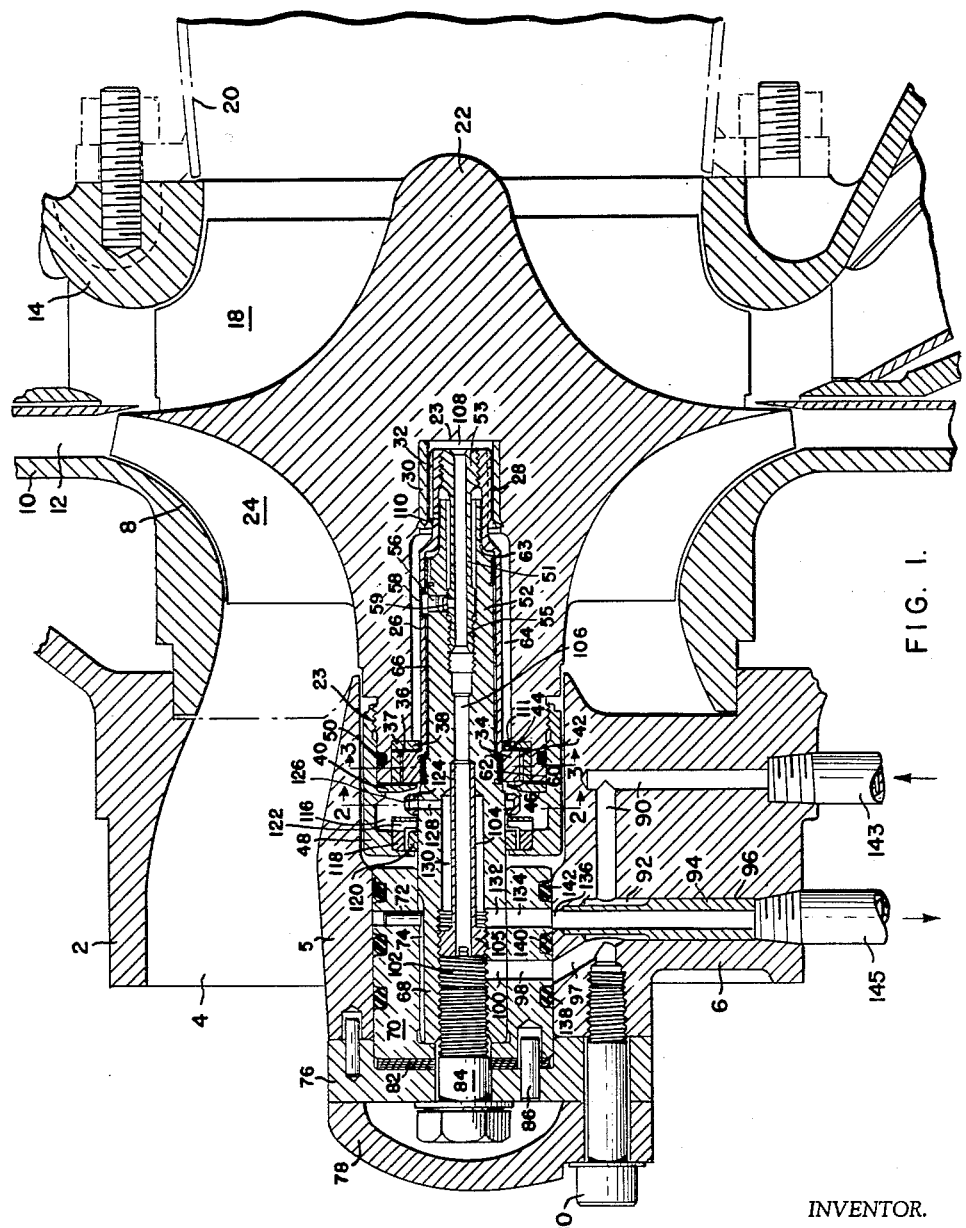
Figure 1 is a fragmentary axial section taken through a turbo-compressor showing the rotor bearing details.

Referring to Figure 1, the compressor portion of a housing is indicated generally at 2 and is provided with an air intake opening 4 in the central portion of which there is axially located a housing 5 for the mounting of a shaft arrangement, this latter housing being supported within the opening 4 by streamlined struts 6 between which the air flow takes place through the intake opening 4. The housing 2 is formed at 8 to provide an outer wall for compressor passages and at 10 is provided with a substantially radial wall forming one boundary of a vaneless diffuser passage 12 which discharges into a compressor scroll surrounding the rotor axis and not shown in the drawing.

A turbine housing 14 is mounted in rigid association with the compressor housing 2 by means not shown in the drawing and provides for a vortex flow of driving gas directed inwardly to enter turbine blades 18 and to be discharged therefrom through an exhaust diffuser 20.

The turbo-compressor rotor 22 mounts the turbine blades 18 and the compressor blades 24. The details of the turbo-compressor structure and operation are more fully described and claimed in my application Serial No. 530,966, filed August 29, 1955.

The rotor 22 is provided on its compressor side with a stepped, axially extending central bore, dead ended at 23 near the center of gravity of the rotor. The rotor is mounted on and rotates around a light non-rotatable spool 26, the right-hand end of which, as viewed in Figure 1, is provided with an inboard journal surface 28. A steel-backed lead-bronze bushing 30 is press fitted into the rotor and rotates therewith on the journal bearing surface 28. The journal surface 28 is provided with oil grooves 32.

The outboard end of the spool 26 is formed with a thrust collar 34 supporting the left-hand compressor end of the rotor 22 as viewed in Figure 1. A steel-backed lead-bronze bushing 36 is press fitted in a recess 37 in the rotor and rotates on the outer cylindrical surface of the thrust collar 34. Inboard and outboard thrust washers 38 and 40, respectively, are positioned on opposite sides of the bushing 36. Axially extending oil grooves 42 are provided in the inner cylindrical surface of the bushing 36 and generally radially extending oil grooves 44 and 46 are provided in the working radial faces of the thrust washers 38 and 40, respectively. The thrust washers and the bushing 36 are retained in position by a flanged rotor cap 48 which is threaded onto the outboard end of the rotor 22 as indicated at 23. An O-ring 50 is positioned in a recess in the rotor under the rotor cap to prevent leakage therebetween.

The right-hand end of the spool 26, as viewed in Figure 1 is threaded over the right-hand end 53 of a tubular member 51 which may be referred to as a link since, as will appear, it has the function of a universally mounted link. The left hand end of the link 51 is threaded at 55 to a shaft 52. A dowel pin 56 is pressed into the shaft 52 and extends with a loose fit into a bore 58 in the spool 26 assuring proper location of the spool and shaft relative to each other but with some freedom of movement. A similar dowel pin 59 loosely connects the link 51 and shaft 52 to prevent unthreading but provide some freedom of relative movement. The threads at 53 and 55 have slight looseness (involving clearances of the order of 0.003 to 0.004 inch) so that there is freedom of angular movement between the spool 26 and the link and between the link and the shaft 52. Thus, the spool 26 is free to tilt slightly and/or move radially by a small amount with respect to the shaft 52.

The left-hand end of the spool 26 is formed with an internal recess 60 spaced from the outer surface of the shaft 52. A hexagonal spring strip 62 is positioned between the shaft and the spool surface 60 serving to center the spool on the shaft. This structure is shown in section in Figure 3. A similar hexagonal spring strip 63 is provided between the right-hand portion of shaft 52 and the spool 26.

The spool 26 is spaced from the wall of the rotor 22 providing an annular chamber 64 extending between the bushing 30 and the thrust collar 34. The shaft 52 is spaced inwardly from the spool 26 providing an annular clearance 66. A similar, but smaller, clearance exists between the reduced diameter right-hand end of shaft 52 and the reduced bore in spool 26. This latter clearance (of the order of 0.003 inch) limits the total radial freedom of the rotor, and the combination of this clearance with clearance 66 defines the total angular freedom of the rotor. This reduced diameter right-hand end of shaft 52 reaches almost to the center of the inboard journal bearing and has a thin cylindrical wall which can deflect slightly upon contact with the bore of the spool piece, which, in combination with the fact that the shaft itself has a certain amount of flexibility, accounts for the fact that the final stopping of rotor movement is not sudden but is accomplished in a slightly resilient fashion.

The left-hand end 68 of the shaft 52 is press fitted into a cylindrical bearing support 70 and a dowel pin 72 is pressed into the bearing support 70 and extends into a keyway 74 in the shaft 68 assuring proper location of these two parts with respect to each other.

The bearing support 70 fits snugly into the bearing housing 5. A member 76 and a bearing housing cover 78 are secured in position against the housing 5 by means of bolts 80 extending into the housing. The left-hand end of the bearing support 70 is spaced from the member 76 by means of shims 82. The left-hand end 68 of the shaft is internally threaded and is drawn against the shims 82 by means of a bolt 84 acting against the left-hand face of the member 76 as viewed in Figure 1. A dowel pin 86 is press fitted into the member 76 and extends through the shims 82 into the bearing support 70 assuring proper location of these parts with reference to each other. It will be evident that this structure serves to mount rigidly the shaft 52 in the bearing housing 5 and provides for longitudinal axial adjustment of the position of the shaft 52 and thus of the position of the rotor 22 by proper selection of shims 82.

The shaft 52 is substantially rigid. However, due to the loose threads at the ends of link 51, the spool is free to tilt slightly and/or move radially with a limited degree of motion. The outboard or left-hand end of the spool 26 is supported by the centering spring strip 62 and the inboard portion by the spring strip 63, which, while permitting a limited amount of substantially unrestrained radial motion of the rotor, serve to damp the rotor motion. Further damping is provided by the presence of oil in the spaces between the springs 62 and 63 and the adjacent surfaces of the shaft 52 and the spool 26 as will be hereinafter described.

As previously noted, when the rotor is rotating at high speeds it will seek to rotate around an axis extending through its center of gravity. The mounting structure described including the centering springs 62 and 63 affords substantially no interference with orbit seeking rotor operation resulting in rotor rotation around an axis extending through the center of gravity of the rotor. While the rotor mounting means must be extremely flexible so as to impose substantially no restraint on the orbit seeking operation of the rotor, the degree of flexibility must be limited in order to prevent undesirable precession from taking place. The small clearances between the spool 26 and shaft 52 and the damped centering springs 62 and 63 serve to limit the degree of this motion while, at the same time, permitting, within the limited degree, extreme freedom of motion.

Figure 3:
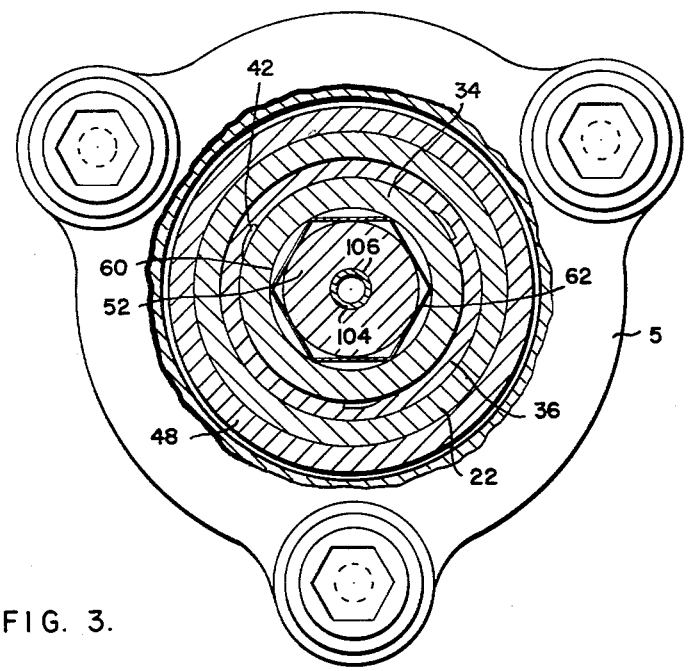
Figure 3 is a transverse section taken on the trace 3—3 shown in Figure 1.
Figure 4:
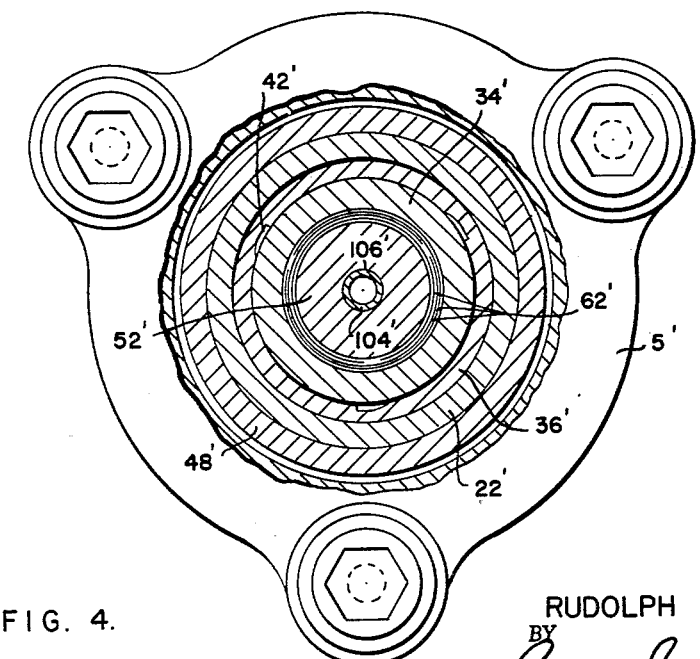
Figure 4 is a showing of an alternative structure which may be employed in place of that shown in Figure 3.

In Figure 4 there is shown an alternative form of damping spring arrangement from that shown in Figure 3. This alternative arrangement involves the use of a plurality of split bands 62 spaced by oil films. These bands may be, for example, .003" shim stock and as many as eight or ten concentric bands may be employed. In the drawing there is shown only three bands for simplicity of showing. It will be evident, however, that the plurality of bands and the plurality of oil films therebetween will provide a damped yielding centering action similar to that provided by the centering spring 62 shown in Figure 3. The damping arrangement just described may be provided in either or both of the positions of springs 62 and 63.

Lubricating oil for the rotor bearings is supplied through oil inlet passages 90 in the strut 6 and flows through an annular passage 92 around a sleeve 94 in a bore 96 in the strut 6. The oil flow continues through a bore 97 in the bearing housing 5 and through aligning bores 98 and 100 in the bearing support 70 and the shaft end 68, respectively, whereby oil is delivered to the space 102 within the shaft 68 at the right-hand end of the bolt 84 as viewed in Figure 1. A sleeve 104 is positioned in the bore 102 by means of an externally threaded enlarged left-hand end 105 mating with the threads within the bore 102. The right-hand end of the tube 104 extends for a short distance into the bore 106 within the shaft 52. Oil flow from the bore 102 passes through the interiors of the tube 104, shaft 52 and link 51 to the space 108 at the end of the link.

From the space 108 oil flows through the oil grooves 32 in the spool 26 to the space 64 between the rotor 22 and the spool 26. Some of the oil flowing through the oil grooves 32 passes through radial bores 110 at the left end of the grooves 32 and passes to the annular space 66 between the spool 26 and the shaft 52. The oil flows to the left, as viewed in Figure 1, through this space to the centering springs 62 and 63 and serves to maintain a sufficient quantity of oil in the vicinity of these springs to provide the desired damping action. Oil flowing from the vicinity of the centering spring 62 passes to the chamber 116 formed within the rotor cap 48.

When the rotor is rotating, oil in the annular chamber 64 will form a thin annular layer lying against the inside surface of the rotor. This centrifugal action keeps the oil clear of the stationary spool 26 and, in this manner, prevents frictional loss from occurring by virtue of drag which would otherwise be provided by the oil layer if it engaged both the stationary spool and the rotating rotor. Centrifugal pressure presses air bubbles out of the annular oil layer.

Oil flowing over the radially inner surface of the thrust washer 37 and through drilled holes 111 flows radially outwardly through the oil grooves 44 to the oil grooves 42 in the inner face of the bushing 36. From the oil grooves 42 the oil flows to the radially extending oil grooves 46 in the thrust washer 40 and flows radially inwardly therethrough spilling over the radially inner surface of the thrust washer 40 and flowing into a chamber 116 formed within the rotor cap 48.

The drilled holes 111 extending through the thrust washer 37 in the region of the outer surface of the annular chamber 64 insure the delivery of oil to the thrust bearing assembly even when only a small quantity of oil is present in the annular chamber 64, such as during starting of the rotor rotation.

The oil flows successively through the grooves 44, 42 and 46 lubricating successively the inboard radial face of the thrust bearing, the outer peripheral face of the journal bearing and the radial outboard face of the thrust bearing. The flow of oil is due to the fact that oil enters through bore 106 along the axis of the rotor and is entrained in a rotational flow by the dead end of the bore at 23. This builds up pressure which is further increased by rotation in space 64.

Due to the fact that the journal bearing is surrounded by a completely enclosed channel formed by the thrust washers, lubrication of the bearing is always assured for the reason that the entire journal bearing is not only submerged in oil but in oil having very high pressure, i.e., of the order of 200 to 300 p.s.i., as the result of centrifugal forces acting on the oil.

The left-hand end portion of the rotor cap 48, as viewed in Figure 1, surrounds the shaft 68 with a slight clearance and mounts an oil ring retainer 118 having a flange spaced from the end portion of the rotor cap 48 and surrounding the shaft 68 with a slight clearance. Between the oil ring retainer and the bottom of the rotor cap there is positioned a floating bronze oil seal ring 120. The oil ring retainer is provided with an annular array of radially extending bores 122 passing through the flange and terminating adjacent to the rotor shaft. These bores also form openings in the flange adjacent to the floating oil seal ring 120. Oil leakage around the shaft is prevented by centrifugal forces flinging the oil to the outside of the chamber 116 and also by the floating bronze oil seal ring 120.

Figure 2:
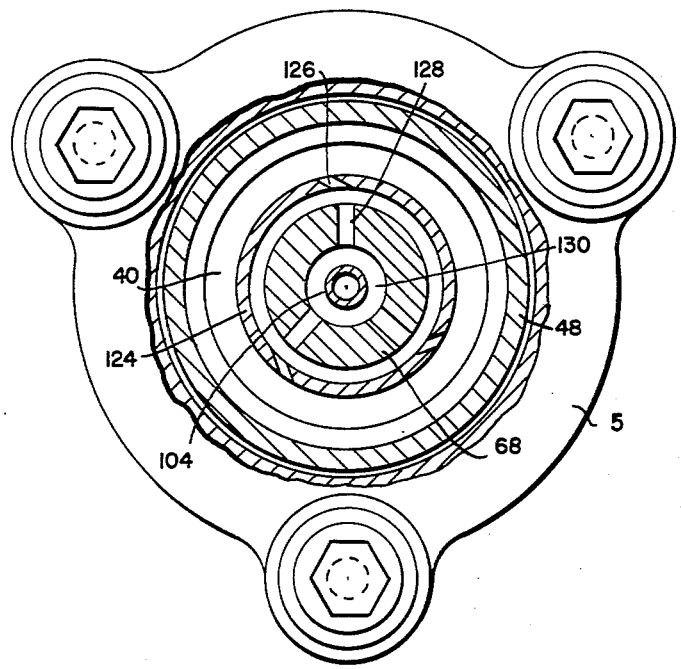
Figure 2 is a transverse section taken on the trace 2—2 shown in Figure 1.

A circular channel member or oil scoop ring 124 having inwardly turned flanges in engagement with the outer surface of the shaft 68 is positioned in the chamber 116 between the oil ring retainer 118 and the thrust washer 40. The oil scoop ring is provided with three tangential holes 126 extending through its periphery as best shown in Figure 2. It will be evident that, upon rotation of the rotor and of the annular body of oil within the chamber 116, the radially inner level of the annular body of oil is regulated by the tangential holes in the scoop ring which skim oil out of the chamber 116 and into the scoop ring.

Oil from the scoop ring flows through radial bores 128 in the shaft portion 68 in alignment with the channel within the scoop ring and to the annular space 130 between the shaft 68 and the sleeve 104 positioned therein. Oil is carried from the space 130 by aligned bores 132, 134 and 136 extending through the shaft portion 68, the bearing support 70 and the bearing housing 5, respectively. This oil flow is delivered to the passage within the sleeve 94 extending into the strut 6.

O-rings 138, 140 and 142 are positioned in grooves in the outer surface of the bearing support 70 and provide a seal between the bearing support and the bearing housing 5 preventing flow of oil therebetween, and between or from the bores 98 and 134.

As previously noted, the oil scoop ring 124 will determine the depth of the annular layer of oil within the chamber 116. The oil enters the ring 124 with sufficient velocity to provide ample pressure to cause the oil to flow through the scoop ring, the bores 128 and the annular space 130 to the discharge passages 132, 134 and 136.

Figure 5:
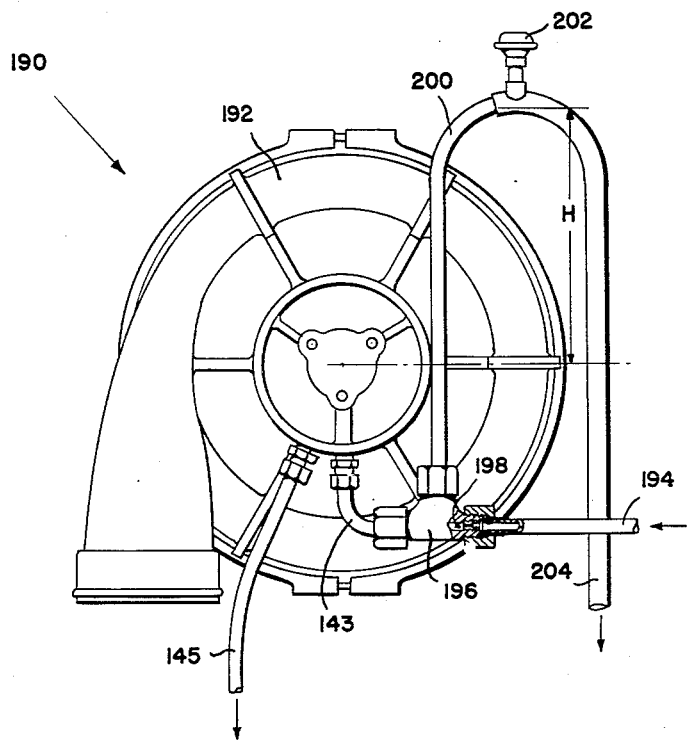
Figure 5 is an elevation showing a form of lubrication system employed in association with the turbo-compressor shown in Figure 1.

A lubricating system for use in the case of lubrication from the engine lubricating system is shown generally at 190 in Figure 5. In this arrangement the oil supply to the turbo-compressor 192 is delivered through a line 194 to a T fitting 196 through an orifice 198. This orifice serves to limit the quantity of oil supplied from the engine. One output connection from the T fitting is connected to the oil supply line 143 and to the turbo-compressor 192. The other outlet from the T fitting is connected to an upwardly extending loop 200 provided at its upper end with an air vent 202 and having its other downwardly extending leg 204 connected to the engine oil sump. The height of this loop above the turbo-compressor axis as indicated at H will provide a head establishing and limiting the maximum pressure of the oil delivered to the turbo-compressor and excess oil is drained back through line 204. The vent 202 on the top of the loop assures proper oil drainage. Return oil flow from the turbo-compressor passes through the return line 145 to the engine sump.

It will be noted that oil is supplied to the turbo-compressor through the branch of the T that is directly opposite to the branch containing the metering orifice. This arrangement provides the high velocity oil flow discharge through the orifice to produce a ram effect on the oil supply to the turbo-compressor bearings which reduces the required height H of the loop to a dimension which is convenient for almost any installation.

As noted above in the description of the arrangement shown in Figure 1, the pumping action of the scoop ring 124 is sufficient to drive the return oil flow outwardly through the discharge line 145. This makes possible the use of a closed recirculating lubricating oil system and such a system is indicated generally at 168 in Figure 6. In the use of a closed system, however, it is necessary to provide an absolutely tight seal of the lubricating oil system otherwise the closed oil system would empty itself. The only location for leakage of the oil out of the system shown in Figure 1 is between the shaft 68 and the cup 48 when the rotor is stationary. In Figure 6 there is shown a turbo-compressor 182 having the construction shown in Figure 1 with the exception of the portion thereof shown in section.

The structure shown in Figure 6 includes a rotor cap 48 and a shaft portion 68 identical to those shown in Figure 1. However, in this embodiment of the invention the oil ring retainer 170 is identical to the oil ring retainer 118 described in connection with Figure 1 with the exception of the fact that a portion of the left-hand side of its radial flange 172 has been cut away. A floating oil seal ring 174 rides on the surface of the shaft portion 68 and is prvoided with an annular axially-directed flange 176 spaced between the shaft 68 and the outer annular flange of the oil ring retainer 170.

A neoprene U-cup seal 178 is positioned between the floating oil seal ring and the bottom of the rotor cap 48 with the flange 176 of the floating oil seal ring extending between the flanges of the U-cup 178. The inner flange 180 of the U-cup seal is formed to provide a sealing lip contacting the shaft 68 when the rotor is stationary. When the rotor is rotating the U-cup seal 178 rotates therewith and centrifugal forces lift the lip away from the shaft 68 before dangerously high rubbing speeds are reached. Thus, the U-cup seal does not work during normal rotor operation when it is not needed and it is only at low speeds, during starting and stopping, and while the rotor is stationary that the U-cup seal provides the necessary seal with the shaft to prevent leakage of oil. It will be evident that it is only at this time that oil within the chamber 116 does not assume the form of an annulus within the outer region of the chamber.

The closed recirculating lubricating oil system includes the use of a reservoir 180 positioned sufficiently high above the axis of the turbo-compressor, as indicated at H, to provide the necessary oil head for the delivery of oil at the desired pressure through oil supply line 143' to the turbo-compressor. The scoop pump discharges oil from the turbo-compressor through the line 145' with sufficient pressure to return the oil to the reservoir 180. Thus, this arrangement provides an entirely closed recirculating oil system in which flow of oil from the reservoir 180 to the turbo-compressor bearings is effected by gravity and in which return flow of oil from the turbo-compressor to the reservoir is effected by the scoop pump.

This application is a continuation-in-part of my copending application Serial No. 520,181, filed July 6, 1955, now Patent No. 2,911,138.

What is claimed is:

1. An elastic fluid handling device comprising a rotor having a hub carrying blading, and mounting means for rotatably mounting said rotor, said mounting means comprising a spool member, a bearing at least partially located within said hub and supporting the hub on said spool member, and means mounting said spool member comprising a stationary housing, and a shaft fixed by one end portion directly in, and carried by, said housing, the opposite end portion of said shaft extending into and mounting said spool member.

2. An elastic fluid handling device comprising a rotor having a hub carrying blading, and mounted means for rotatably mounting said rotor, said mounting means comprising a spool member, bearings at least partially located within said hub and supporting the hub on substantially the ends of said spool member, and means mounting said spool member comprising a stationary housing, a shaft fixed by one end portion directly in, and carried by, said housing, the opposite end portion of said shaft extending into said spool member, and flexible means mounting said spool upon said shaft for limited movement thereof relative to said shaft.

3. An elastic fluid handling device comprising a rotor having a hub carrying blading and mounting means for rotatably mounting said rotor, said mounting means comprising a spool member, bearings at least partially located within said hub and supporting the hub on substantially the ends of said spool member, and means mounting said spool member comprising a stationary housing, a shaft fixed by one end portion directly in, and carried by, said housing, the opposite end portion of said shaft extending into said spool member, and flexible means operatively interposed between said shaft and spool and mounting said spool upon said shaft for limited tilting and/or cross-axial movement thereof relative to said shaft.

4. An elastic fluid handling device comprising a rotor having a hub carrying blading, and mounting means for rotatably mounting said rotor, said mounting means comprising a spool member, bearings at least partially located within said hub and supporting the hub on substantially the ends of said spool member, and means mounting said spool member comprising a stationary housing, a shaft fixed by one end portion directly in, and carried by, said housing, the opposite end portion of said shaft extending into said spool member, and flexible means including a link operatively interposed, and connected, between said shaft and spool member and mounting said spool upon said shaft for limited tilting and/or cross-axial movement thereof relative to said shaft.

5. An elastic fluid handling device comprising a rotor having a hub carrying blading, and mounting means for rotatably mounting said rotor, said mounting means comprising a spool member, bearings at least partially located within said hub and supporting the hub on substantially the ends of said spool member, and means mounting said spool member comprising a stationary housing, a shaft fixed by one end portion directly in, and carried by, said housing, the opposite end portion of said shaft extending into said spool member, and flexible means operatively interposed between said shaft and spool and mounting said spool upon said shaft for limited tilting and/or cross-axial movement thereof relative to said shaft including means for damping movements of the spool member.

6. An elastic fluid handling device comprising a rotor having a hub carrying blading, and mounting means for rotatably mounting said rotor, said mounting means comprising a spool member, bearings at least partially located within said hub and supporting the hub on substantially the ends of said spool member, and means mounting said spool member comprising a stationary housing, a shaft fixed by one end portion directly in, and carried by, said housing, the opposite end portion of said shaft extending into said spool member, and flexible means including a link operatively interposed between, and having opposite end portions loosely threadedly connected respectively to, the shaft and spool member and mounting said spool upon said shaft for limited tilting and/or cross-axial movement thereof relative to said shaft, and means securing said link and spool member against turning about said shaft so as to tighten said threaded connections during operation of the rotor.

7. A turbo-compressor comprising a rotor having a hub carrying compressor blading at one axial side thereof and turbine blading at the other axial side thereof, and mounting means for said rotor, said mounting means comprising a substantially stationary member extending into an axial bore formed in said hub on the side thereof carrying the compressor blading and having an intermediate section of a diameter substantially less than that of the bore section through which it extends thereby to provide an annular recess between said stationary member and the bore wall, and a bearing assembly supporting the hub on said member, said bearing assembly comprising a sleeve bearing mounted on said member within said hub, and a thrust bearing mounted on said member spaced from said sleeve bearing said annular recess being radially of a size sufficient for the flow of an annular layer of oil axially along said bore wall out of contact with said member.

8. A turbo-compressor comprising a rotor having a hub carrying compressor blading at one axial side thereof and turbine blading at the other axial side thereof, and mounting means for said rotor, said mounting means comprising a substantially stationary member, a bearing assembly at least partially located within said hub at the side thereof carrying the compressor blading and supporting the hub on said member, means for passing oil through said bearing assembly including means for retaining an annular body of oil rotating with said hub and stationary scoop means paring off the radially inner surface of said annular body of oil, an oil reservoir, and conduits for delivering oil from said reservoir to said bearing assembly and from said scoop means to said reservoir, said bearing assembly, scoop means, conduits and reservoir forming a closed lubricating system wherein lubricating oil is circulated from the reservoir to the bearing assembly by the force of gravity and from the bearing assembly to the reservoir by the action of said scoop means.

References Cited in the file of this patent

UNITED STATES PATENTS

| | | |
|---|---|---|
| 2,322,824 | Buchi | June 29, 1943 |
| 2,480,095 | Buchi | Aug. 23, 1949 |